US009516266B2

(12) United States Patent
Pycock et al.

(10) Patent No.: US 9,516,266 B2
(45) Date of Patent: *Dec. 6, 2016

(54) SHARING CONTENT

(71) Applicant: Microsoft Technology Licensing, LLC, Redmond, WA (US)

(72) Inventors: James Edgar Pycock, Palo Alto, CA (US); Jakob O. Engstrand, New York, NY (US); Mateusz Tomaszewski, Bedford (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/160,843

(22) Filed: May 20, 2016

(65) Prior Publication Data

US 2016/0269679 A1 Sep. 15, 2016

Related U.S. Application Data

(63) Continuation of application No. 14/617,897, filed on Feb. 9, 2015, now Pat. No. 9,363,471.

(30) Foreign Application Priority Data

Mar. 4, 2014 (GB) .................................. 1403807.9

(51) Int. Cl.
*H04N 7/14* (2006.01)
*H04L 12/58* (2006.01)
(Continued)

(52) U.S. Cl.
CPC .............. *H04N 7/141* (2013.01); *H04L 51/04* (2013.01); *H04L 51/16* (2013.01);
(Continued)

(58) Field of Classification Search
CPC ........................................................ H04N 7/14
(Continued)

(56) References Cited

U.S. PATENT DOCUMENTS 5,915,091 A * 6/1999 Ludwig ................. G06Q 10/10
348/E7.081
9,363,471 B2 6/2016 Pycock et al.
(Continued)

FOREIGN PATENT DOCUMENTS

EP 1304882 4/2003
EP 2018058 1/2009
(Continued)

OTHER PUBLICATIONS

"International Search Report and Written Opinion", Application No. PCT/US2015/016855, Jul. 14, 2015, 18 Pages.
(Continued)

*Primary Examiner* — Olisa Anwah
(74) *Attorney, Agent, or Firm* — Tom Wong; Micky Minhas

(57) ABSTRACT

A user terminal comprising: a network interface; a display; a content sharing module configured to display content shared with a further user terminal on the display, and receive position data from the further user terminal via the network interface, said position data indicating a position within the shared content associated with a user at the further user terminal; and a communications module. The communications module configured to: receive video data from the further user terminal over a communications network during a communication event with at least said further user terminal via the network interface; and control the video data received from said further user terminal to be displayed on said display in dependence on the position within the shared content associated with the user at the further user terminal.

20 Claims, 7 Drawing Sheets

(51) Int. Cl.

| | | |
|---|---|---|
| *H04W 4/14* | (2009.01) | |
| *H04N 21/258* | (2011.01) | |
| *H04N 21/431* | (2011.01) | |
| *H04N 21/439* | (2011.01) | |
| *H04N 21/478* | (2011.01) | |
| *H04N 21/4788* | (2011.01) | |
| *H04N 21/63* | (2011.01) | |

(52) U.S. Cl.
CPC ... *H04N 21/25841* (2013.01); *H04N 21/4316* (2013.01); *H04N 21/4394* (2013.01); *H04N 21/4781* (2013.01); *H04N 21/4788* (2013.01); *H04N 21/632* (2013.01); *H04W 4/14* (2013.01)

(58) Field of Classification Search
USPC .......... 348/14.01, 14.03, 14.07, 14.08, 14.16
See application file for complete search history.

(56) References Cited

U.S. PATENT DOCUMENTS

| | | | |
|---|---|---|---|
| 9,379,999 B2* | 6/2016 | Lynch | H04L 47/783 |
| 2007/0184855 A1 | 8/2007 | Klassen et al. | |
| 2011/0202603 A1 | 8/2011 | Mate et al. | |
| 2011/0219307 A1 | 9/2011 | Mate et al. | |
| 2013/0194374 A1 | 8/2013 | Kieft et al. | |
| 2013/0242064 A1 | 9/2013 | Herdy | |
| 2013/0263021 A1 | 10/2013 | Dunn et al. | |
| 2014/0232816 A1 | 8/2014 | Wilson et al. | |
| 2015/0256793 A1 | 9/2015 | Pycock et al. | |
| 2016/0065896 A1* | 3/2016 | Chow | H04N 7/148 348/14.03 |

FOREIGN PATENT DOCUMENTS

| | | |
|---|---|---|
| JP | 2009017463 | 1/2009 |
| WO | WO-2015065929 | 5/2015 |

OTHER PUBLICATIONS

"Search Report", GB Application No. 1403807.9, Sep. 22, 2015, 3 pages.
"Non-Final Office Action", U.S. Appl. No. 14/617,897, Nov. 19, 2015, 4 pages.
"Notice of Allowance", U.S. Appl. No. 14/617,897, Feb. 9, 2016, 5 pages.
"Second Written Opinion", Application No. PCT/US2015/016855, Jan. 26, 2016, 8 pages.
"International Preliminary Report on Patentability", Application No. PCT/US2015/016855, Apr. 14, 2016, 9 pages.
Cricri,"Mobile and Interactive Social Television—A Virtual TV Room", World of Wireless, Mobile and Multimedia Networks & Workshops, 2009. IEEE International Symposium, Jun. 15, 2009, 8 Pages.
Ishii,"ClearFace: Translucent Multiuser Interface for Team WorkStation", In Proceedings of the Second European Conference on Computer-Supported Cooperative Work; Amsterdam, The Netherlands, Sep. 25, 1991, 12 pages.
Ishii,"Integration of Interpersonal Space and Shared Workspace: ClearBoard Design and Experiments", In Proceedings: ACM Transactions on Information Systems, vol. 11, Issue 4, Oct. 1993, pp. 349-375.
Kunz,"CollaBoard: A Novel Interactive Electronic Whiteboard for Remote Collaboration with People on Content", In Proceeding of the IEEE International Conference on Cyberworlds, Oct. 2010, 8 pages.
Mate,"Consumer Experience Study of Mobile and Interactive Social Television", World of Wireless, Mobile and Multimedia Networks & Workshops, WOWMOM 2009 IEEE International Symposium, Jun. 15, 2009, 6 Pages.
Mate,"Mobile and Interactive Social Television", IEEE Communications Magazine, IEEE Service Center, Piscataway, US vol. 47, No. 12, Dec. 1, 2009, 7 Pages.
Roussel,"VideoSpace: A Toolkit for Building Mediaspaces", In Proceeding of the Research report, LRI, Université Paris-Sud, France, May 1999, 11 pages.

* cited by examiner

SHARING CONTENT

RELATED APPLICATIONS

This application is a continuation of and claims priority under 35 U.S.C §120 to U.S. patent application Ser. No. 14/617,897, filed Feb. 9, 2015, entitled "Sharing Content," which claims priority under 35 USC §119 or §365 to Great Britain Patent Application No. 1403807.9 entitled "Sharing Content" filed Mar. 4, 2014, the disclosures of which are incorporated by reference herein in their entirety.

BACKGROUND

Packet-based communication systems allow the user of a device, such as a personal computer, to communicate across the computer network using a packet protocol such as Internet Protocol (IP). Packet-based communication systems can be used for various types of communication events. Communication events which can be established include voice calls, video calls, instant messaging, voice mail, file transfer and others. These systems are beneficial to the user as they are often of significantly lower cost than fixed line or mobile networks. This may particularly be the case for long-distance communication. To use a packet-based system, the user installs and executes client software on their device. The client software provides the packet-based connections as well as other functions such as registration and authentication.

Communications systems allow users of devices to communicate across a computer network such as the internet. Communication events which can be established include voice calls, video calls, instant messaging, voice mail, file transfer and others. With video calling, the callers are able to view video images of the other party in addition to voice information. This enables a much more natural communication between the parties, as facial expressions are also communicated, thereby making video calls more comparable to a face-to-face conversation.

Whilst a communication event is being conducted between users, known client software allows a user to share the contents of their screen with the other user. That is, a first user at a first terminal (the "sharer") can decide to share the contents of his screen with a second user at a second terminal (the "viewer") via the established communication event. As an example, screen sharing can be particularly useful when the first user is trying to explain what they are seeing on their screen to the second user because with screen sharing the viewer can see images that are displayed on the sharer's screen.

Additionally, collaboration software is known whereby a user of the collaboration software can make modifications to shared content whereby the content and the modifications are displayed to the user and others users of the collaboration software. Often the users of the collaboration software additionally use communication client software to establish a communication event so that the contents and the modifications to the content can be discussed.

SUMMARY

The inventors have recognised that in both the screen sharing and collaborative scenarios discussed above, when a video call is being conducted between users the shared experience is disrupted by a user having to switch from viewing the shared content to viewing the video data received from another user. This may be a result of the shared content and the received video data being displayed in separate areas of a user's screen or being displayed in separate windows which a user must toggle between.

According to one aspect there is provided a user terminal comprising: a network interface; a display; a content module configured to display content shared with a further user terminal on the display, and receive position data from the further user terminal via the network interface, said position data indicating a position in the shared content of a user at the further user terminal; and a communications module configured to: receive video data from the further user terminal over a communications network during a communication event with at least said further user terminal via the network interface; control the video data received from said further user terminal to be displayed on said display in dependence on the position in the shared content of the user at the further user terminal This enables a user of the user terminal to view both the shared media content and the received video data at the same time without having to glance from one part of the display to another or to switch viewing windows.

According to another aspect there is provided a computer program product, the computer program product being embodied on a non-transient computer-readable medium and configured so as when executed on a processor of a user terminal comprising a display to: receive video data from a further user terminal over a communications network during a communication event with at least said further user terminal; receive position data indicating a position within content shared with the further user terminal displayed on the display, said position associated with a user at the further user terminal; and control the video data received from said further user terminal to be displayed on said display in dependence on the position within the shared content associated with the user at the further user terminal.

According to a further aspect there is provided a method implemented at a user terminal, the method comprising: receiving video data from a further user terminal over a communications network during a video call with said further user terminal via a network interface of said user terminal; displaying content shared with the further user terminal on the display; receiving position data from the further user terminal via the network interface, said position data indicating a position within the shared content associated with a user at the further user terminal; controlling the video data received from said further user terminal to be displayed on said display to overlay said displayed content in dependence on the position within the shared content associated with the user at the further user terminal.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

For a better understanding of the present disclosure and to show how the same may be put into effect, reference will now be made, by way of example, to the following drawings in which.

DETAILED DESCRIPTION

Figure 1:
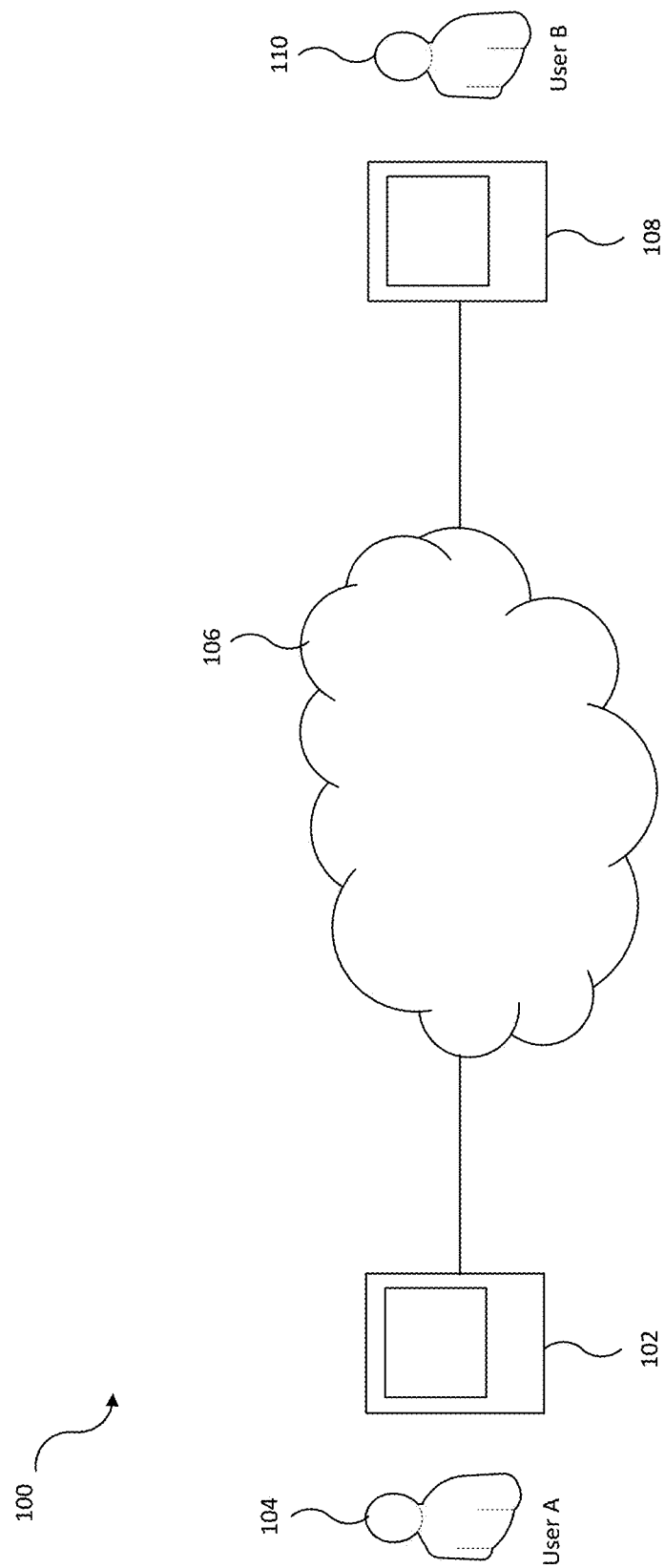
FIG. 1 shows a communication system.

FIG. 1 shows a communication system 100 comprising a first user 104 (User A) who is associated with a first user terminal 102 and a second user 110 (User B) who is associated with a second user terminal 108. Whilst only two users have been shown in FIG. 1 for simplicity, the communication system 100 may comprise any number of users and associated user devices. The user terminals 102 and 108 can communicate over the network 106 in the communication system 100, thereby allowing the users 104 and 110 to communicate with each other over the network 106. The network 106 may be any suitable network which has the ability to provide a communication channel between the first user terminal 102 and the second user terminal 108. For example, the network 106 may be the Internet or another type of network such as a High data rate mobile network, such as a 3$^{rd}$ generation ("3G") mobile network. The user terminal 102 may be, for example, a mobile phone, a personal digital assistant ("PDA"), a personal computer ("PC") (including, for example, Windows™, Mac OS™ and Linux™ PCs), a tablet computer, a gaming device or other embedded device able to connect to the network 106. The user terminal 102 is arranged to receive information from and output information to the user 104 of the user terminal 102.

The user terminal 102 executes a communication client application, provided by a software provider associated with the communication system 100. The communication client application is a software program executed on a local processor in the user terminal 102. The communication client application comprises the communications module referred to above. The communication client application performs the processing required at the user terminal 102 in order for the user terminal 102 to transmit and receive data over the communication system 100. The communication client application executed at the user terminal 102 may be authenticated to communicate over the communication system through the presentation of digital certificates (e.g. to prove that user 104 is a genuine subscriber of the communication system—described in more detail in WO 2005/009019).

The user terminal 108 may correspond to the user terminal 102. The user terminal 108 executes, on a local processor, a communication client application which corresponds to the communication client application executed at the user terminal 102. The communication client application at the user terminal 108 performs the processing required to allow the user 110 to communicate over the network 106 in the same way that the communication client application at the user terminal 102 performs the processing required to allow the user 104 to communicate over the network 106. The user terminals 102 and 108 are end points in the communication system. FIG. 1 shows only two users (104 and 110) and two user terminals (102 and 108) for clarity, but many more users and user devices may be included in the communication system 100, and may communicate over the communication system 100 using respective communication clients executed on the respective user devices, as is known in the art.

Figure 2:
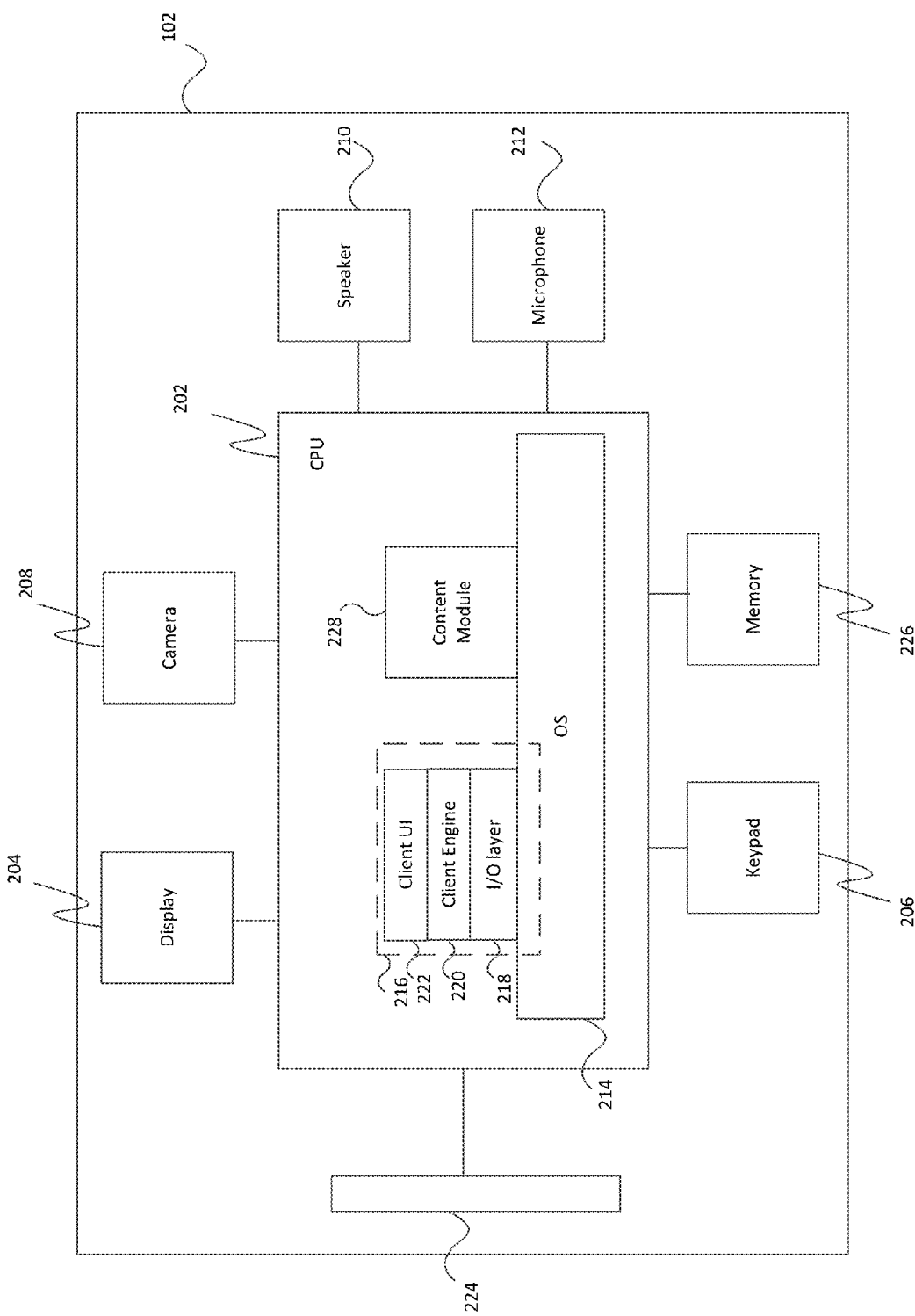
FIG. 2 shows a schematic view of a user terminal.

FIG. 2 illustrates a detailed view of the user terminal 102 on which is executed a communication client application for communicating over the communication system 100. The user terminal 102 comprises a central processing unit ("CPU") 202, to which is connected a display 204 such as a screen or touch screen, input devices such as a keypad 206, a camera 208, and touch screen 204. An output audio device 210 (e.g. a speaker) and an input audio device 212 (e.g. a microphone) are connected to the CPU 202. The display 204, keypad 206, camera 208, output audio device 210 and input audio device 212 may be integrated into the user terminal 102 as shown in FIG. 2. In alternative user terminals one or more of the display 204, the keypad 206, the camera 208, the output audio device 210 and the input audio device 212 may not be integrated into the user terminal 102 and may be connected to the CPU 202 via respective interfaces. One example of such an interface is a USB interface. The CPU 202 is connected to a network interface 224 such as a modem for communication with the network 106. The network interface 224 may be integrated into the user terminal 102 as shown in FIG. 2. In alternative user terminals the network interface 224 is not integrated into the user terminal 102. The user terminal 102 also comprises a memory 226 for storing data as is known in the art. The memory 226 may be a permanent memory, such as ROM. The memory 226 may alternatively be a temporary memory, such as RAM.

FIG. 2 also illustrates an operating system ("OS") 214 executed on the CPU 202. Running on top of the OS 214 is a software stack 216 for the communication client application referred to above. The software stack shows an I/O layer 218, a client engine layer 220 and a client user interface layer ("UI") 222. Each layer is responsible for specific functions. Because each layer usually communicates with two other layers, they are regarded as being arranged in a stack as shown in FIG. 2. The operating system 214 manages the hardware resources of the computer and handles data being transmitted to and from the network 106 via the network interface 224. The I/O layer 218 comprises audio and/or video codecs which receive incoming encoded streams and decodes them for output to speaker 210 and/or display 204 as appropriate, and which receive unencoded audio and/or video data from the microphone 212 and/or camera 208 and encodes them for transmission as streams to other end-user terminals of the communication system 100. The client engine layer 220 handles the connection management functions of the VoIP system as discussed above, such as establishing calls or other connections by server-based or P2P address look-up and authentication. The client engine may also be responsible for other secondary functions not discussed herein. The client engine 220 also communicates with the client user interface layer 222. The client engine 220 may be arranged to control the client user interface layer 222 to present information to the user of the user terminal 200 via the user interface of the client which is displayed on the display 204 and to receive information from the user the user terminal 200 via the user interface.

FIG. 2 also illustrates a content sharing module 228 executed on the CPU 202. The content sharing module 228 is configured to display media content "shared" with the second user 110 associated with the second user terminal 108 on the display 204. Reference to "shared" media content is used herein to refer to media content that is displayed at both the first user terminal 102 and the second user terminal 108. The content sharing module 228 is described in more detail below.

Figure 3:
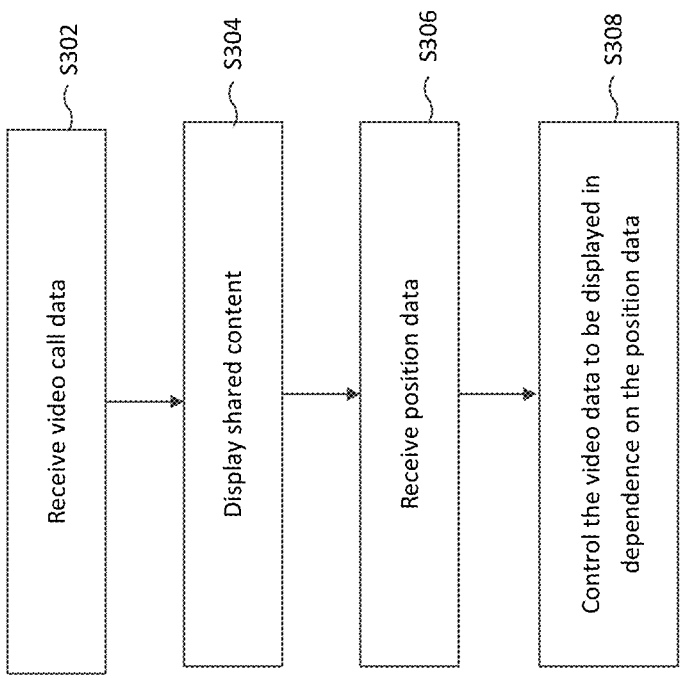
FIG. 3 is a flow chart for a process of displaying received video call data.

Reference is now made to FIG. 3 which illustrates a process 300 of a method performed at the user terminal 102 whilst a video call is being conducted between the first user terminal 102 and the second user terminal 108.

During the video call between the first user terminal 102 and the second user terminal 108, at step S302 first user terminal 102 receives, via the network interface 224, encoded video data transmitted from the second user terminal 108 (frames of image data captured by the camera 208 of the second user terminal 108) over the network 106. The I/O layer 218 of the communication client application executed on the first user terminal 102 receives the incoming encoded video stream and decodes the encoded video stream. The client engine 220 controls the client user interface layer 222 to display the decoded video data to the first user 104 via the user interface of the client displayed on display 204.

During the video call between the first user terminal 102 and the second user terminal 108, the first user terminal may also receive, via the network interface 224, encoded audio data transmitted from the second user terminal 108 (captured by the microphone 212 of the second user terminal 108) over the network 106. The I/O layer 218 of the communication client application executed on the first user terminal 102 receives the incoming encoded audio data and decodes the encoded audio data for output to speaker 210.

At step S304, the content sharing module 228 displays media content that is shared between the first user terminal 102 and the second user terminal 108 on the display 204 of the first user terminal 102.

At step S306, the content sharing module 228 receives position data from the second user terminal 108 via the network interface 224, the position data indicating a position within the shared media content associated with the second user 110 at the second user terminal 108.

At step S308, the communication client application executed on the first user terminal 102 controls the video data received from the second user terminal 108 to be displayed on the display 204 of the first user terminal 102 in dependence on the position in the shared content of the second user 110 at the second user terminal 108.

The process 300 is now described in more detail with reference to, by way of example, a number of illustrative embodiments.

In one embodiment, the communication client application executed on the CPU 202 of the first user terminal 102 may comprise the content sharing module 228. In a screen sharing context, the first user terminal 102 may act as a "sharer terminal", in this example the content sharing module 228 enables an image (screen capture of the display 204 of the first user terminal 102) to be transmitted to a "viewer terminal" i.e. the second user terminal 108. The first user terminal 102 may alternatively act as a "viewer terminal", in this example the content sharing module 228 enables an image (screen capture of a display 204 at the sharer terminal i.e. second user terminal 108) to be received and displayed on the display 204 of the first user terminal 102. When the image displayed at the sharer terminal is changed then those changes are received at the viewer terminal, and the image displayed on the display at the viewer terminal can be updated accordingly to reflect the changes. When only certain areas of the image are changed at the viewer terminal then screen rectangles representing those areas in need of updating are received at the viewer terminal.

Figure 4:
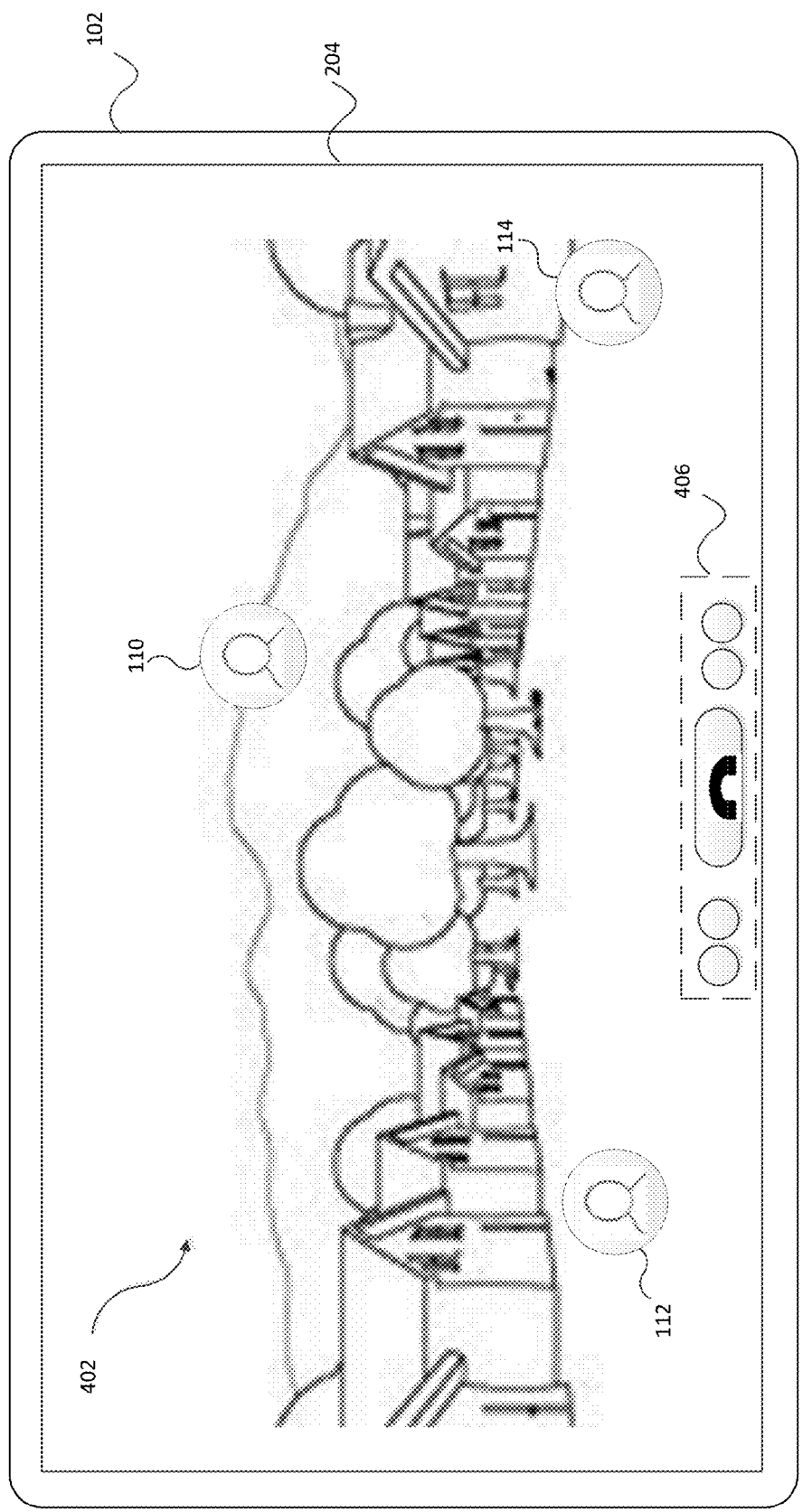
FIG. 4 illustrates a user terminal displaying shared media content and received video call data.

FIG. 4 illustrates the first user terminal 102 displaying shared media content 402 on the display 204 in a screen share scenario. In this example, the shared media content is a photograph 402.

During a video call between the first user terminal 102 and the second user terminal 108, the first user terminal 102 receives, via the network interface 224, video data transmitted from the second user terminal 108 (step S302).

During the video call, the second user 110 makes an appropriate selection to display a photograph 402 on the display 204 of the second user terminal 108, and selects to the share the contents of his screen by making an appropriate selection via the user interface of the communication client application executed on the second user terminal 108. Thus in this example the first user terminal 102 acts as a "viewer terminal".

In response to this selection, the image of the photograph 402 (screen capture of a display 204 at the second user terminal 108 is transmitted to the first user terminal 102. The photograph 402 may be stored locally in memory on the second user terminal 108, in which case the photograph 402 is transmitted from the second user terminal 108 to the first user terminal 102. Alternatively the photograph 402 may be stored on a computing device (for example a server) in the communication network 106, in which case the photograph 402 is transmitted from the computing device to the first user terminal 102.

At step S304, the content sharing module 228 displays the photograph 402 on the display 204 of the first user terminal 102, as shown in FIG. 4.

At step S306, the content sharing module 228 receives position data from either the second user terminal 108 or one or more computing devices in the communication network 106, via the network interface 224. The position data indicates a position within the photograph 402 that the second user 110 is interacting with (i.e. the second user's place in the shared media content). The content sharing module 228 supplies the position data to the communication client application executed on the first user terminal 102.

A screen image displayed on the display 204 of the second user terminal 108 is made up of a number of pixels, the number of pixels used to represent the screen image is dependent on the resolution of the display 204 of the second user terminal 108 (the number of pixels in each dimension that can be displayed). Each pixel has an x-coordinate and a y-coordinate, where x refers to the distance along the horizontal axis from a reference point and y refers to the distance along the vertical axis from the reference point.

The interaction with the photograph 402 by the second user 110 may be the second user 110 moving the position of a cursor displayed on the display 204 of the second user terminal 108 over the displayed photograph 402, the position of which is controlled by the second user 110 moving a mouse or other input device such as the keypad 206. The position of a cursor (often termed a cursor "hot spot") can be expressed by an x-coordinate and a y-coordinate of a pixel of a screen image that is displayed on a display. Typically, the hot spot is the focal point of the cursor. For example, typical hot spots are the pixel at the tip of an arrow-shaped cursor and the pixel in the middle of a crosshair-shaped cursor. In this example, the position data comprises an x-coordinate and a y-coordinate indicating the position of the cursor that is displayed on the display 204 of the second user terminal 108.

The interaction with the photograph 402 by the second user 110 may be the second user 110 physically touching the display 204 of the second user terminal 108 corresponding to an area of the photograph 402, in the case that the display 204 comprises a touch screen. It will be appreciated that the area of the display 204 touched by the second user will typically correspond to a plurality of pixels of the screen image displayed on the display 204. In this example, the position data may comprise for example x/y-coordinates of the plurality of pixels, or an x-coordinate and a y-coordinate of a pixel determined to be in the centre of the plurality of pixels.

It will be appreciated by persons skilled that a positioning mechanism based on pixels/co-ordinates is just one example of how to indicate a position within shared content that a user is interacting with. Embodiments of the present disclosure extend to other positioning mechanisms known in the art which convey positions in content. For example, the shared the content might have its own model like a Microsoft Excel® spreadsheet where each box has its own reference, in this example the position data mat indicate the box which a user is interacting with, rather than screen pixels.

If the resolution of the displays of the first user terminal 102 and the second user terminal are different, the position data may additionally comprise the resolution of the display 204 of the second user terminal 108. It will be appreciated that this ensures that the content sharing module 228 is able to accurately determine the position within the photograph 402 that the second user 110 is interacting with.

At step S308, the communication client application executed on the first user terminal 102 controls the video data received from the second user terminal 108 to be overlaid on top of the photograph 402 displayed on the display 204 of the first user terminal 102 (as shown in FIG. 4). The video data received from the second user terminal 108 is displayed, using the position data, at a position on the display 204 to indicate where the second user 110 is interacting with the photograph 402 (i.e. to indicate the second user's place in the shared media content).

If the position within the photograph 402 that the second user 110 is interacting with changes (i.e. the second user 110 moves the position of the cursor displayed on the display 204 of the second user terminal 108, or touches a different area of the touch screen) then the communication client application executed on the first user terminal 102 moves the displayed video data received from the second user terminal 108 accordingly to indicate this change in the area of the photograph 402 that the second user 110 is interacting with.

Whilst only two user terminals have been shown in FIG. 1 for simplicity, it will be appreciated that a video call maybe conducted between more than two users using respective user terminals and media content may be shared between these plurality of user terminals and principles of the present disclosure extend to such scenarios. For example, if a video call is conducted between the first user 104 at the first user terminal 102, the second user 110 at the second user terminal 108, and two additional users (i.e. a third user 112 at a third user terminal and a fourth user 114 at a fourth user terminal). In accordance with principles of the present disclosure, as shown in FIG. 4, received video data from users 110, 112 and 114 may be displayed on the display 204 of the first user terminal 102 in dependence on the respective positions within the shared media content associated with users 110, 112 and 114.

In other embodiments, a separate application executed on the CPU 202 to the communication client application may comprise the content sharing module 228. Data is exchanged between the communication client application and the separate application to enable the communication client application and the separate application to communicate with each other. The communication client application and the separate application may each comprise an application programming interface (API) to facilitate this data exchange.

For example, a collaborative workspace application executed on the CPU 202 of the first user terminal 102 may comprise the content sharing module 228. In this embodiment, the content sharing module 228 allows users of the communication system 100 to work together (i.e. collaborate) on a document or other data structure as part of a collaborative authoring process. The data structure may originate for example from a word processing application, a presentation application, a spreadsheet application etc. The content sharing module 228 on the first user terminal 102 is configured to display an original data structure on the display 204. The content sharing module 228 may access the original data structure from local storage on the first user terminal 102 or from one or more computing devices in the communication network 106, or from the second user terminal 108. Any modification to the original data structure by either the first user 104 at the first user terminal 102 or the second user 110 at the second user terminal 108 is presented by the content sharing module 228 of the first user terminal 102 on the display 204. The application comprising the content sharing module 228 may be a dedicated collaborative workspace application as described above, or may be an application to which collaborative features have been added (e.g. a web browser).

Figure 5:
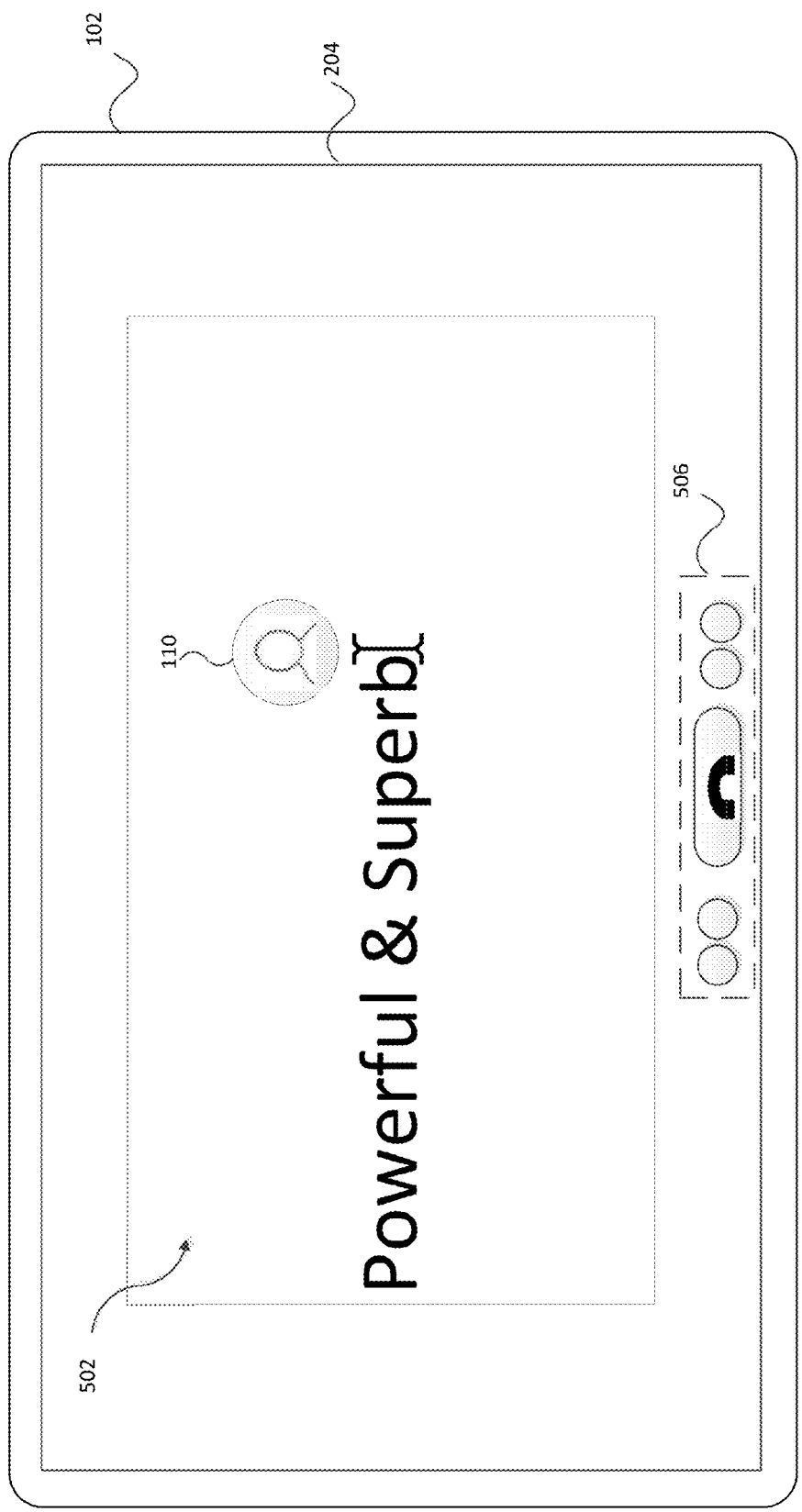
FIG. 5 illustrates a user terminal displaying shared media content and received video call data.

FIG. 5 illustrates the first user terminal 102 displaying shared collaborative content 502 on the display 204 in a collaborative workspace scenario. In FIG. 5, the shared collaborative content is a presentation 502 created in a presentation application; however the shared media content may be any other type of collaborative content.

During a video call between the first user terminal 102 and the second user terminal 108, the first user terminal 102 receives, via the network interface 224, video data transmitted from the second user terminal 108 (step S302). During the video call, the content sharing module 228 on the first user terminal 102 displays the presentation 502 on the display 204 of the first user terminal 102 (step S304), as shown in FIG. 5.

At step S306, the content sharing module 228 receives position data from either the second user terminal 108 or one or more computing devices in the communication network 106, via the network interface 224. The position data indicates a position within the presentation 502 that the second user 110 is interacting with. Example types of interaction are described above with reference to FIG. 4. The position data may comprise coordinates of at least one pixel as described above with reference to FIG. 4. The content sharing module 228 supplies the position data to the communication client application executed on the first user terminal 102.

At step S308, the communication client application executed on the first user terminal 102 controls the video data received from the second user terminal 108 to be overlaid on top of the presentation 502 displayed on the display 204 of the first user terminal 102 (as shown in FIG. 5). The video data received from the second user terminal 108 is displayed, using the position data, at a position on the display 204 to indicate where the second user 110 is interacting with the presentation 502 (i.e. to indicate the second user's place in the shared media content).

Whilst FIG. 5 shows the video data received from the second user terminal 108 being displayed above a text cursor where the second user 110 is editing the presentation, this is merely example. As the second user 110 edits the presentation 502 using the second user terminal 108 the communication client application executed on the first user terminal 102 moves the displayed video data received from the second user terminal 108 accordingly to indicate the change in the area of the presentation 502 that the second user 110 is interacting with.

In another embodiment, a gaming application executed on the CPU 202 of the first user terminal 102 comprises the content sharing module 228. In this embodiment, the gaming application enables users of the communication system 100 to share a gaming experience of a video game. For example the first user 104 at the first user terminal 102 may share a gaming experience of a video game with the second user 110 at the second user terminal 108. The content sharing module 228 on the first user terminal 102 alters the display of the shared gaming experience on the display 204 of the first user terminal 102 in response to detecting input selections on the keypad 206 of a gaming controller by the first user 104 at the first user terminal 102. The content sharing module 228 is also configured to receive gaming data from the second user terminal 108 or one or more computing devices (gaming servers) in the communication network 106 in response to input selections on the keypad 206 of a gaming controller by the second user 110 at the second user terminal 102. The content sharing module 228 alters the display of the shared gaming experience on the display 204 of the first user terminal 102 in response to receiving this gaming data. That is, the shared gaming experience is reflected on the displays of both the first user terminal 102 and the second user terminal 108.

Figure 6:
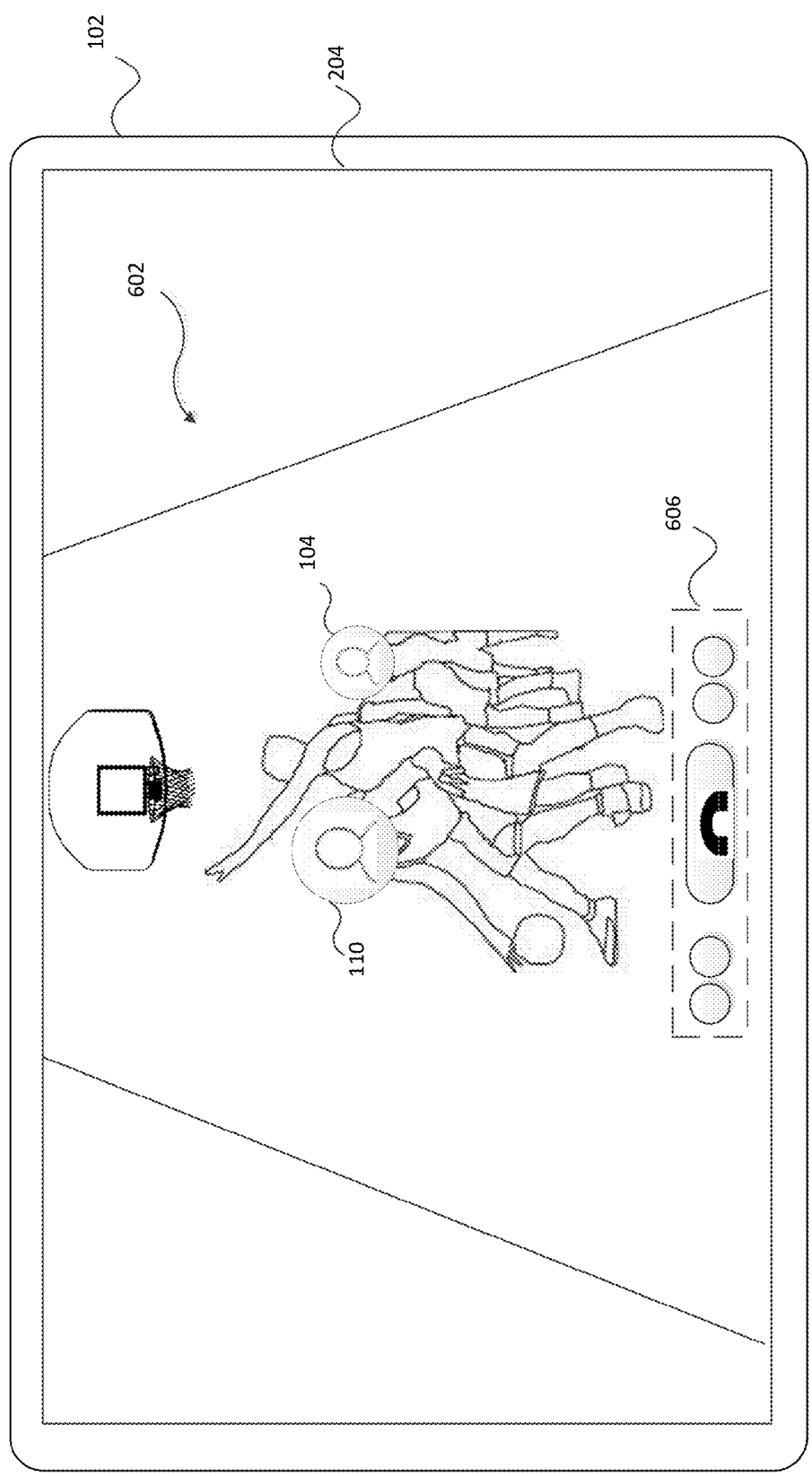
FIG. 6 illustrates a user terminal displaying shared media content and received video call data.

FIG. 6 illustrates the first user terminal 102 displaying shared media content 602 on the display 204 in a gaming scenario. In FIG. 6, the shared media content is video game content 602 displayed on both the first user terminal 102 and the second user terminal 108. FIG. 6 shows the video game content 602 as content of a basketball video game for mere illustration purposes.

Whilst the video game content 602 is being displayed on the display 204 of the first user terminal 102 (step S304), a video call between the first user 104 at the first user terminal 102 and the second user 110 at the second user terminal 108 may be conducted. During the video call between the first user terminal 102 and the second user terminal 108, the first user terminal 102 receives, via the network interface 224, video data transmitted from the second user terminal 108 (step S302).

At step S306, the content sharing module 228 receives position data from either the second user terminal 108 or one or more computing devices in the communication network 106, via the network interface 224. The position data indicates a position within the video game content 602 that the second user 110 is interacting with. The content sharing module 228 supplies the position data to the communication client application executed on the first user terminal 102.

Input selections on the keypad 206 of a gaming controller by the second user 110 at the second user terminal 102 may be used to interact with the video game content 602 by for example moving an in-game representation of the second user 110 (for example a character) in the video game. The position data may comprise information pertaining to the position of the in-game representation of the second user 110 in the video game.

At step S308, the communication client application executed on the first user terminal 102 controls the video data received from the second user terminal 108 to be overlaid on top of the video game content 602 displayed on the display 204 of the first user terminal 102 (as shown in FIG. 6). The video data received from the second user terminal 108 is displayed, using the position data, at a position on the display 204 to indicate where the second user 110 is interacting with the video game content 602 (i.e. to indicate the second user's place in the shared media content).

For example, the communication client application executed on the first user terminal 102 may control the video data received from the second user terminal 108 to be overlaid on top of the video game content 602 in dependence on the position of the in-game representation of the second user 110 in the video game—this is shown in FIG. 6. As the second user 110 moves the in-game representation of the second user 110 in the video game the communication client application executed on the first user terminal 102 moves the displayed video data received from the second user terminal 108 accordingly to indicate the change in the area of the video game content 602 that the second user 110 is interacting with.

In a further embodiment, a mapping application executed on the CPU 202 of the first user terminal 102 comprises the content sharing module 228. In this embodiment, the content sharing module 228 is configured to display map data and indicate the geographical position of users of the communication system 100. The content sharing module 228 on the first user terminal 102 is configured to receive map data and location information of the second user terminal 108 from the second user terminal 108 or one or more computing devices (map servers) in the communication network 106. This enables the content sharing module 228 to indicate the geographical position of the second user terminal 108 to the first user 104 at the first user terminal 102.

During a video call between the first user terminal 102 and the second user terminal 108, the first user terminal 102 receives, via the network interface 224, video data transmitted from the second user terminal 108 (step S302). During the video call, the second user 110 may select to send their geographic position to the first user terminal 102 over the communication network 106 during the video call. The second user 110 may make such a selection in the user interface of the communication client executed on the second user terminal 108 using an input device of the second user terminal 108.

Upon the second user 110 selecting to send their geographic position to participants in the video call (i.e. the first user terminal 102) during the video call. The communication client executed on the second user terminal 108 requests location information from a location determination module on the second user terminal 108. Upon receiving this request, the location determination module on the second user terminal 108 determines the location of the second user terminal 108.

The location determination module on the second user terminal 108 uses geographic location technology for determining the location of the second user terminal 108, in terms of geographic position relative to the surface of the earth; for example, using a satellite based positioning system such as GPS (Global Positioning System, including potential variants such as assisted GPS or differential GPS), GLONASS (Global Navigation Satellite System) or Galileo; and/or trilateration (or more generally muiltilateration) relative to a plurality of different wireless base stations or access points having known locations; and/or a technique based on detecting signal strength relative to a known base station or access point; or another known method.

The location determination module supplies this location information to a mapping application executed on the second user terminal 108. The location information may comprise a longitude and latitude of the second user terminal 108. The location information may additionally comprise an altitude of the second user terminal 108.

The mapping application executed on the second user terminal 108 transmits the location information, with a request for map data via the network interface 224 to a mapping server. The mapping server stores a large set of pre-generated map tile images covering the entire globe, each map tile has a z coordinate describing its zoom level and x and y co-ordinates describing its position. For each zoom level there is a predetermined number of map tile images to cover the entire globe, whereby the greater the zoom level, the greater the number of predetermined number of map tile images are required to cover the entire globe. A single map tile at a lower zoom level illustrates a larger geographic area than a single map tile at a higher zoom level. The mapping server determines, based on the received location information, a subset of map tile images of the large set of pre-generated map tile images stored by the mapping server.

Figure 7B:
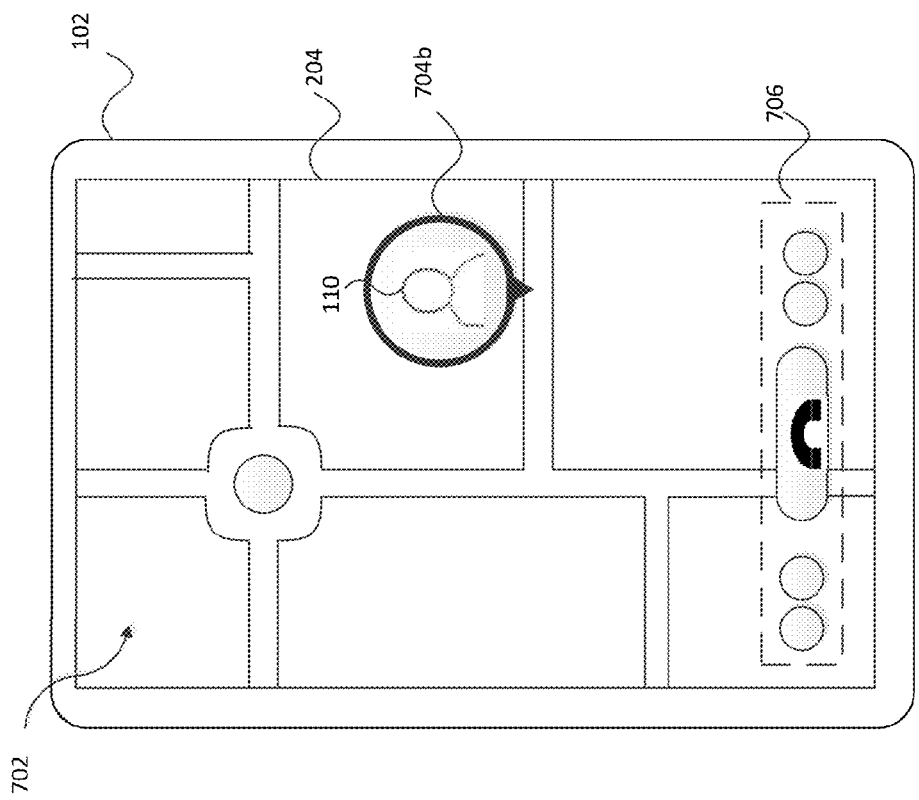
FIGS. 7a and 7b illustrate a user terminal displaying shared media content and received video call data.
Figure 7A:
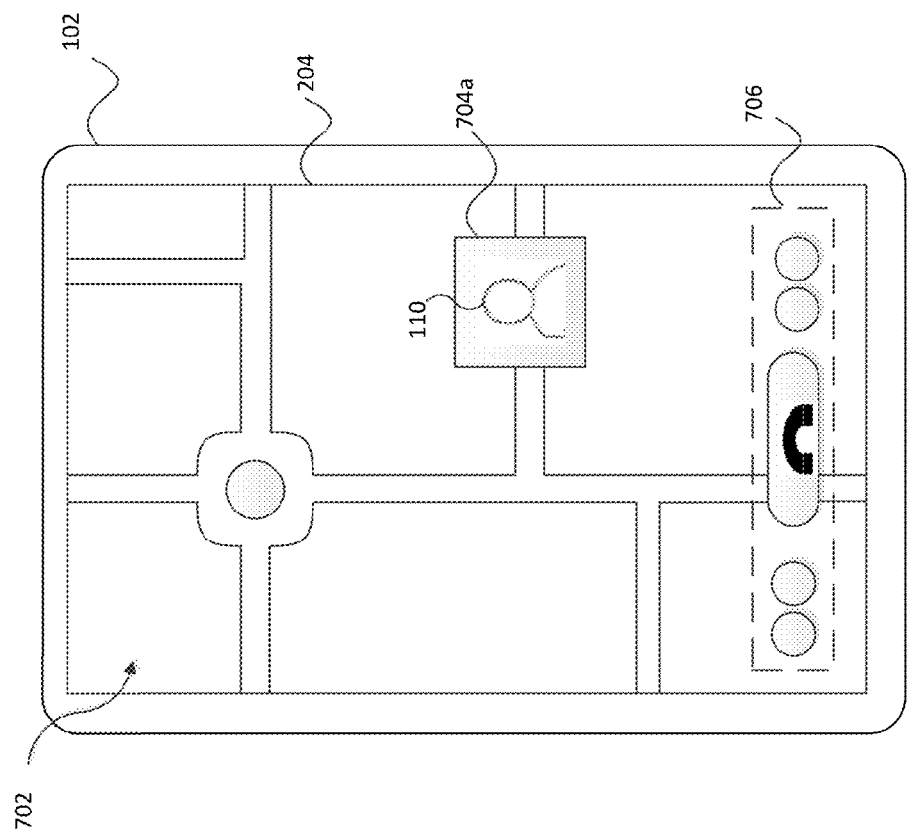

At step S304, the content sharing module 228 on the first user terminal 102 receives the map data (a subset of map tile images) via the network interface 224 and displays the map data 702 on the display 204 of the first user terminal 102, as shown in FIGS. 7a and 7b. At step S306, the content sharing module 228 receives position data (the location information). The position data indicates a geographical position within the map data 702 of the second user terminal 108. The second user's position within the map data 702 moves as the second user 100 moves their geographical position.

The content sharing module 228 on the first user terminal 102 may receive the map data and the position data from one or more computing devices in the communication network 106 (for example the map server) or from the second user terminal 108. The content sharing module 228 supplies the position data to the communication client application executed on the first user terminal 102.

At step S308, the communication client application executed on the first user terminal 102 uses the received position data to control the video data received at step S302 to be displayed in a position of the display 204 to provide a visual indication of the geographical location of the second user terminal 108 with reference to the displayed map 702. That is, by its very nature the map 702 displayed by the content module 228 displays a plurality of geographical locations, and the communication client application executed on the first user terminal 102 controls the video data received from the second user terminal 108 to be displayed on the display 204 to provide a visual indication of the location of the second user terminal 108 at one of the plurality of locations.

Thus both geographical location information and video data are simultaneously displayed on the first user terminal 102 to visually indicate the location of the second user terminal 108 from which the video data is received. This embodiment enables all participants in a video call keep eye-contact, and continue visual communication whilst at the same time clearly communicating each other's geographic location and movements.

In FIG. 7a the video data received from the second user terminal 108 is shown in a window 704a. That is, window 704a displays the real-time video data captured at the second user terminal 108 and transmitted to the first user terminal 102 over the network 106. Alternatively, as shown in FIG. 7b, the video data received from the second user terminal 108 may be shown enclosed within a border 704b, the border 704b comprising a pointer to provide a more accurate indication of the location of the second user terminal 108.

The camera 208 on the second user terminal 108 may comprise a front facing camera and a rear facing camera. During the video call the second user 110 may select to switch the video capture between the front facing camera and the rear facing camera. Responsive to this camera switch, the video data received from the second user terminal 108 may switch from being a view of the second user 110 to a view of the scene surrounding the second user 110.

It will be appreciated from the above, that embodiments of the present disclosure described above let all participants in a video call keep eye-contact and continue visual communication whilst at the same time viewing, and being deeply immersed in the shared media content. In embodiments of the present disclosure a user can move their location in the shared content, and this results in the video data received from that user to move accordingly on the displays of other users in a video call with the user. The user can freely move their position in the shared content in ways that aren't scripted or predetermined, thus the video data received from that user also moves accordingly on the displays of other users in a video call with the user in ways that aren't scripted or predetermined.

Whilst FIGS. 4-7 show the video data received from the second user terminal 108 being displayed by the communication client application such that it fully overlays (i.e. is on top of) the displayed shared media content. In other embodiments, a portion of, or the entire video data received from the second user terminal 108 may not be displayed on top of the displayed shared media content. For example, the shared media content may be displayed in the centre of the display 204 and the video data received from the second user terminal 108 may be displayed partially, or completely, outside the edges of the shared media content and a suitable marker or pointer may be displayed to indicate the position within the shared media content associated with the second user 110 at the second user terminal 108.

In the embodiments described above, the communication client executed on the first user terminal 102 may be configured to control the display of the video data received from the second user terminal 108 based on the audio data received from the second user terminal 108 during the video call.

For example, in response to detecting that the second user 110 at the second user terminal 108 has stopped speaking the communication client executed on the first user terminal 102 may reduce the size of the displayed video data received from the second user terminal 108 (the representation of the second user 110 is reduced) such that the display of the video data received from the second user terminal 108 requires less physical space on the display 204.

Alternatively, or additionally, in response to detecting that the second user 110 at the second user terminal 108 has stopped speaking the communication client executed on the first user terminal 102 may increase the transparency of the displayed video data received from the second user terminal 108 (the representation of the second user 110 is reduced).

In both examples above, the first user 104 is able to view the shared media content more easily when the video data received from the second user terminal 108 is overlayed over the shared media content. This is advantageous when the second user 110 at the second user terminal 108 has stopped speaking and it is more desirable for the first user 104 to view the shared media content rather than the video data received from the second user terminal 108.

In the embodiments described above, the communication client application executed on the first user terminal 102 may display the video data received from other users in the video call, in video windows displayed on the display 204 of the first user terminal 102. In addition to the above examples, the communication client application may apply other aesthetic effects to the received video and/or video windows. For example the communication client application may blur the boundaries of the displayed video windows to make the video window merge more with the shared content.

In the embodiments described above, the communication client application executed on the first user terminal 102 may overlay selectable buttons (406,506,606,706) for the first user 104 to select using an appropriate input device during the video call. The selectable buttons may comprise a button to end the video call, to mute audio such that no audio data received during the video call is output from the speaker 210, to control the volume of audio output from the speaker 210, and other functionality related to the video call. By overlaying the selectable buttons on top of the shared media content, the size of the displayed shared media content is maximised which is advantageous on mobile devices with limited display size. Alternatively a portion of or all of the selectable buttons may not be displayed on top of the displayed shared media content. For example, the selectable buttons may be displayed outside the edges of the displayed shared media content.

The video data displayed by the communication client application on the display 204 may be a selectable input. That is, the first user 104 may select the displayed video data using an appropriate input device of the first user terminal 102.

In response to the first user 104 selecting the displayed video data the communication client application may increase the size of the displayed video data. That is, in response to the communication client application detecting selection of the displayed video data, the communication client application may utilise a larger physical portion of the display 204 to display the received video data i.e. the communication client application executed on the first user terminal 102 zooms in on the displayed video data. This enables the first user 104 to be provided with a larger view of the received video data. This is advantageous when it is more desirable for the first user 104 to view the received video data received from the second user terminal 108 rather than the shared media content.

In response to the first user 104 selecting the displayed video data the communication client application may provide the user with one or more selectable options pertaining to the functionality provided by the communication client application. The one or more selectable options may be selected by the first user 104 using an appropriate input device on the first user terminal 102.

The one or more selectable options may include an option to view profile information of the second user 110, to send the second user 110 a Short Message Service (SMS) message, to send the second user 110 an IM message, to send the second user 110 a data file, to view IM conversation history between the first user 104 and the second user 110 etc. It will be appreciated that these examples are used herein to illustrate the concept and further selectable options may be provided the communication client application that are not described herein.

The steps shown separately in FIG. 3 may or may not be implemented as separate steps. Furthermore, the steps S302, S304, and S306 may not be necessarily implemented in the order shown in FIG. 3 and may be implemented in an alternative order. For example, in the embodiment described above with reference to FIG. 5, the first user 110 and the second user 110 may be conducting a video call using their respective terminals and then decide to start working collaboratively on some shared media content. Alternatively, the first user 110 and the second user 110 may be working collaboratively on some shared media content and then decide to conduct a video call.

Whilst only two user terminals have been shown in FIG. 1 for simplicity, it will be appreciated that a video call maybe conducted between more than two users using respective user terminals and media content may be shared between these plurality of user terminals and principles of the present disclosure extend to such scenarios. Received video data of a plurality of users may be displayed on the display 204 of the first user terminal in dependence on the respective positions within the shared media content associated with the plurality of users. Whilst this has been explained above, with reference to the screen share embodiment (shown in FIG. 4), this applies to all other embodiments described herein.

The communication client application executed on the first user terminal 102 is configured to transmit captured video data of the first user 104 (captured using camera 208) to other user terminals of other users in the video call. In the embodiments described above, during the video call the communication client application executed on the first user terminal 102 may display the captured video data of the first user 104 on the display 204 of the first user terminal 102. Furthermore, the content sharing module 228 on the first user terminal 102 may be configured to detect a position within the shared media content associated with the first user 104 and communicate this to the communication client application executed on the first user terminal 102. The content sharing module 228 supplies this position data to the communication client application executed on the first user terminal 102.

The communication client application executed on the first user terminal 102 may control the captured video data of the first user 104 to be displayed on the display 204 of the first user terminal 102 in dependence on the position in the shared content of the first user 104 i.e. where the first user 104 is interacting with the shared media content. This is shown for example in FIG. 6 in the context of the shared gaming experience, wherein the captured video data of the first user 104 is overlaid on top of the video game content 602 in dependence on the position of the in-game representation of the first user 104 in the video game. Whilst this has been explained above, with reference to the shared video game experience embodiment (shown in FIG. 6), this applies to all other embodiments described herein.

Generally, any of the functions described herein can be implemented using software, firmware, hardware (e.g., fixed logic circuitry), or a combination of these implementations. The terms "module," "functionality," "component", "application" and "logic" as used herein generally represent software, firmware, hardware, or a combination thereof. In the case of a software implementation, the module, functionality, or logic represents program code that performs specified tasks when executed on a processor (e.g. CPU or CPUs). The program code can be stored in one or more computer readable memory devices. The features of the techniques described below are platform-independent, meaning that the techniques may be implemented on a variety of commercial computing platforms having a variety of processors.

For example, the user terminals may also include an entity (e.g. software) that causes hardware of the user terminals to perform operations, e.g., processors functional blocks, and so on. For example, the user terminals may include a computer-readable medium that may be configured to maintain instructions that cause the user terminals, and more particularly the operating system and associated hardware of the user terminals to perform operations. Thus, the instructions function to configure the operating system and associated hardware to perform the operations and in this way result in transformation of the operating system and associated hardware to perform functions. The instructions may be provided by the computer-readable medium to the user terminals through a variety of different configurations.

One such configuration of a computer-readable medium is signal bearing medium and thus is configured to transmit the instructions (e.g. as a carrier wave) to the computing device, such as via a network. The computer-readable medium may also be configured as a computer-readable storage medium and thus is not a signal bearing medium. Examples of a computer-readable storage medium include a random-access memory (RAM), read-only memory (ROM), an optical disc, flash memory, hard disk memory, and other memory devices that may use magnetic, optical, and other techniques to store instructions and other data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A user terminal comprising:
a network interface;
a display;
a content sharing module configured to display content shared with a further user terminal on the display, and receive position data from the further user terminal via the network interface, said position data indicating a position within the shared content associated with a user at the further user terminal; and
a communications module configured to:
receive video data from the further user terminal over a communications network during a communication event with at least said further user terminal via the network interface;
control the video data received from said further user terminal to be displayed on said display in dependence on the position within the shared content associated with the user at the further user terminal,
receive audio data from the further user terminal over the communications network during the communication event with at least said further user terminal via the network interface; and
further control the display of the video data received from said further user terminal in response to the received audio data from the further user terminal.

2. The user terminal according to claim 1, wherein when the position within the shared content associated with the user at the further user terminal changes, the communications module is configured to move the displayed video received from said further user terminal to indicate said position change.

3. The user terminal according to claim 1, wherein the communications module is further configured to:
(i) control the video data received from said further user terminal to be displayed on said display by partially overlaying the shared content with the video data received from said further user terminal, or
(ii) control the video data received from said further user terminal to be displayed on said display by fully overlaying the shared content with the video data received from said further user terminal.

4. The user terminal according to claim 1, wherein the content comprises:
(i) a screen capture image displayed on a display of the further user terminal and transmitted to said user terminal,
(ii) collaborative content, wherein any modification to said collaborative content by a user of said user terminal or the user of the further user terminal is displayed on said display,
(iii) video game content of a shared gaming experience between a user of said user terminal and the user of the further user terminal, or
(iv) map data and the position data comprises location information of said further user terminal.

5. The user terminal according to claim 4, wherein the communications module is further configured to control the video data received from said further user terminal to be displayed on said display to provide a visual indication of the geographical location of said further user terminal.

6. The user terminal according to claim 1, wherein the communications module is configured to detect that the user at the further user terminal has stopped speaking and in response to said detection:
reduce the size of the display of the video data received from said further user terminal; and/or
increase the transparency of the display of the video data received from said further user terminal.

7. The user terminal according to claim 1, wherein the communications module is configured to control the video data received from said further user terminal to be displayed as a selectable input.

8. The user terminal according to claim 7, wherein the communications module is configured to detect selection of the displayed video data and in response to said detection, increase the size of the displayed video data.

9. The user terminal according to claim 7, wherein the communications module is configured to detect selection of the displayed video data and in response to said detection, display one or more selectable options for interaction with said further user terminal.

10. The user terminal according to claim 9, wherein the one or more selectable options comprise one or any combination of:
an option to view profile information of a user associated with the further user terminal;
an option to send the user associated with the further user terminal a Short Message Service message;
an option to send the user associated with the further user terminal an instant message;
an option to send the user associated with the further user terminal a data file; and
an option to view an instant message conversation history between a user associated with the user terminal and the further user terminal.

11. A computer program product, the computer program product being embodied on a non-transitory computer-readable medium and configured so as when executed on a processor of a user terminal comprising a display to:
receive video data from a further user terminal over a communications network during a communication event with at least said further user terminal;
receive position data indicating a position within content shared with the further user terminal displayed on the display, said position associated with a user at the further user terminal;

control the video data received from said further user terminal to be displayed on said display in dependence on the position within the shared content associated with the user at the further user terminal;

receive audio data from the further user terminal over the communications network during the communication event with at least said further user terminal via the network interface; and further control the display of the video data received from said further user terminal in response to the received audio data from the further user terminal.

12. A user terminal comprising:
a network interface;
a display;
a content sharing module configured to display content shared with a further user terminal on the display, and receive position data from the further user terminal via the network interface, said position data indicating a position within the shared content associated with a user at the further user terminal; and
a communications module configured to:
receive video data from the further user terminal over a communications network during a communication event with at least said further user terminal via the network interface; and
control the video data received from said further user terminal to be displayed on said display in dependence on the position within the shared content associated with the user at the further user terminal,
wherein the content comprises video game content of a shared gaming experience between a user of said user terminal and the user of the further user terminal.

13. The user terminal according to claim 11, wherein when the position within the shared content associated with the user at the further user terminal changes, the communications module is configured to move the displayed video received from said further user terminal to indicate said position change.

14. The user terminal according to claim 11, wherein the communications module is further configured to:
(i) control the video data received from said further user terminal to be displayed on said display by partially overlaying the shared content with the video data received from said further user terminal, or
(ii) control the video data received from said further user terminal to be displayed on said display by fully overlaying the shared content with the video data received from said further user terminal.

15. The user terminal according to claim 11, wherein the communications module is further configured to:
receive audio data from the further user terminal over the communications network during the communication event with at least said further user terminal via the network interface; and
further control the display of the video data received from said further user terminal in response to the received audio data from the further user terminal.

16. The user terminal according to claim 15, wherein the communications module is configured to detect that the user at the further user terminal has stopped speaking and in response to said detection:
reduce the size of the display of the video data received from said further user terminal; and/or
increase the transparency of the display of the video data received from said further user terminal.

17. The user terminal according to claim 11, wherein the communications module is configured to control the video data received from said further user terminal to be displayed as a selectable input.

18. The user terminal according to claim 17, wherein the communications module is configured to detect selection of the displayed video data and in response to said detection, increase the size of the displayed video data.

19. The user terminal according to claim 17, wherein the communications module is configured to detect selection of the displayed video data and in response to said detection, display one or more selectable options for interaction with said further user terminal.

20. The user terminal according to claim 19, wherein the one or more selectable options comprise one or any combination of:
an option to view profile information of a user associated with the further user terminal;
an option to send the user associated with the further user terminal a Short Message Service message;
an option to send the user associated with the further user terminal an instant message;
an option to send the user associated with the further user terminal a data file; and
an option to view an instant message conversation history between a user associated with the user terminal and the further user terminal.

* * * * *